UNITED STATES PATENT OFFICE.

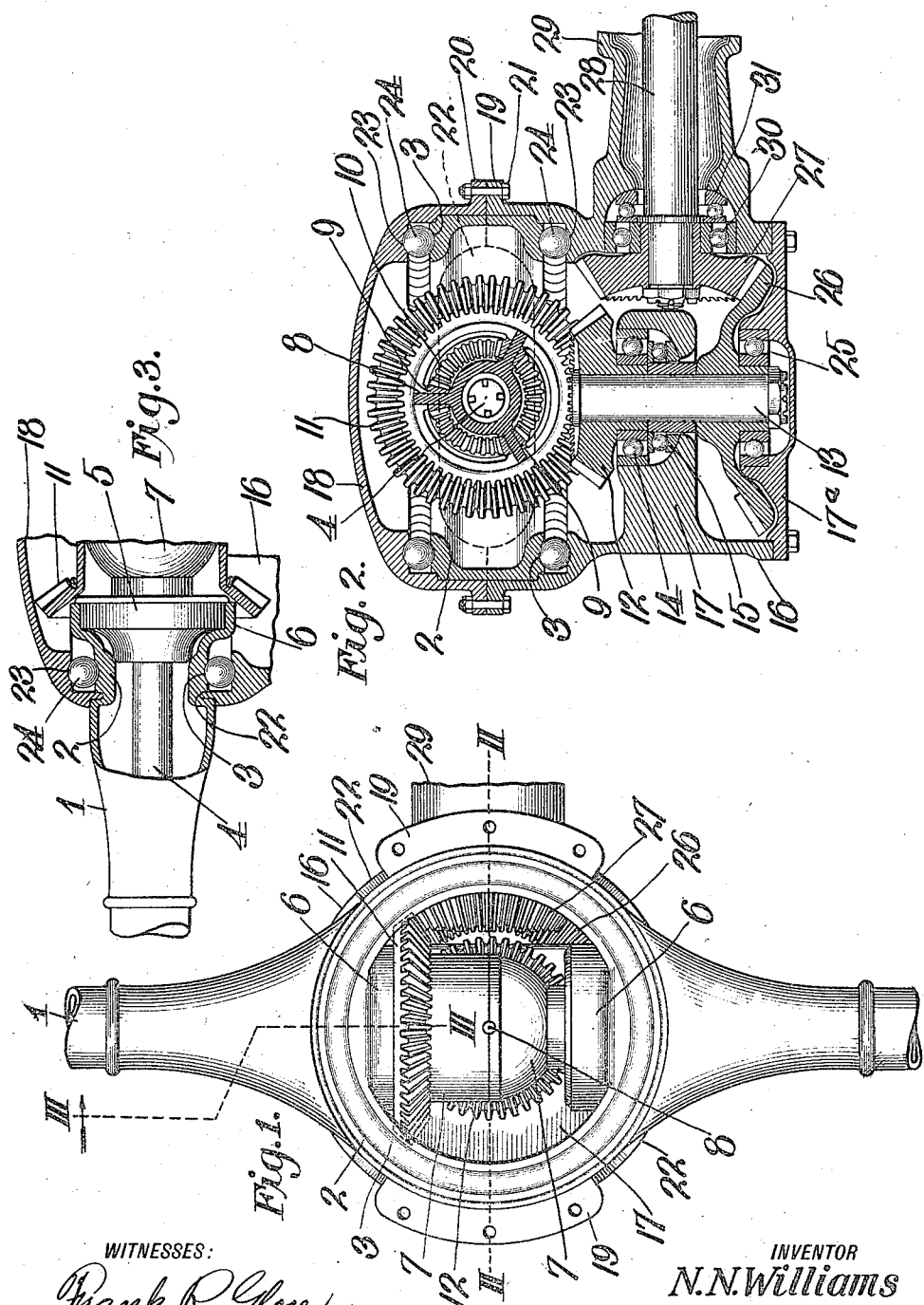

NEZZA N. WILLIAMS, OF KANSAS CITY, MISSOURI.

COMBINED FIFTH-WHEEL AND AXLE DRIVE.

1,170,717.  Specification of Letters Patent.  Patented Feb. 8, 1916.

Application filed November 14, 1914. Serial No. 872,102.

*To all whom it may concern:*

Be it known that I, NEZZA N. WILLIAMS, a citizen of the United States, residing at Kansas City, in the county of Jackson and State of Missouri, have invented certain new and useful Improvements in Combined Fifth-Wheel and Axle Drives, of which the following is a specification.

This invention relates to a combined fifth wheel and axle drive for automobiles, and my object is to produce apparatus of this character suitable for use upon the rear as well as the front axle of an automobile to permit all four wheels of the same to be driven and the axles to be turned in reverse directions simultaneously whereby the car may turn upon a small radius and the wheels at each side follow the same paths or tracks.

Another object is to produce apparatus of the character outlined in which the driving member or shaft occupies a lower plane than the axle to the end that the center of gravity of the car may be lowered and consequently reduce the chances of the car overturning.

A feature of advantage incident to a four-wheeled drive is of course the improbability of both the front and rear wheels standing on ground so slippery that traction cannot be obtained by one set or the other of the wheels. Another advantage is that the application of power on all the wheels renders the wheels less liable to slip and less liable to skid when the car is making a turn. It also permits the use of double sets of brakes so that when the rear wheels skid the application of the front brakes will enable the skidding to be checked.

With the objects named in view, the invention consists in certain novel and peculiar features of construction and organization as hereinafter described and claimed; and in order that it may be fully understood reference is to be had to the accompanying drawings, in which—

Figure 1, is a plan view of the central portion of a motor car axle embodying my invention, the cap or hood forming a part of the gear housing being omitted. Fig. 2, is a section on the line II—II of Fig. 1 with the cap or hood in place. Fig. 3, is a section on the line III—III of Fig. 1.

In the said drawing, 1 is an axle provided with a central ring or circular portion 2 having ball races 3, in its upper and lower sides. Extending through the axle is a drive shaft 4 composed as usual of two endwise abutting members, only one of which appears as the construction may be substantially the same as the rear driving axle of any wellknown motor car. Each member of the drive shaft is suitably journaled at its outer end in the outer portion of the axle and at its inner end is also journaled in the axle. Preferably each member of the drive shaft is provided with an enlargement 5, journaled in a tubular portion 6 projecting inwardly from the ring portion of the axle. Between the inner bearings of shafts 4 is a differential housing composed of two members 7 forming a support for the spider 8, and journaled on the spider are bevel pinions 9, meshing with a pair of bevel gears 10 respectively mounted on the sections of the drive shaft 4. The differential mechanism described is not specifically claimed as it is of well-known type. Any other suitable differential may be used in lieu of the one described, as composed of the housing members 7, the spider 8, the bevel pinion 9 and the shaft gears 10.

To operate the differential, I provide a large gear 11 meshing with an underlying gear 12 secured upon a vertical shaft 13. The shaft 13 is provided with a ball bearing 14 and a thrust bearing 15, both mounted in a horizontal partition or support 17 of a gearing housing composed of a member 16, a bottom 17ª and a cap or hood 18. To unite the tubular member and the cap or hood member of the housing together, said members are provided at diametrically opposite points with outwardly projecting flanges 19 and 20 bolted together as at 21, and at right angles to the said flanges the said members are conjointly formed with slots or elongated openings 22 through which the axle extends as shown most clearly in Fig. 3, the slots being preferably sufficiently long to enable the axle to turn a maximum of fifteen degrees in either direction. To diminish resistance to turning movement of the axle, the housing member 16 and the cap or hood member are provided with annular channels or races 23, balls 24 being interposed between the housing member 16 and the axle and between the latter and the cap and occupying the said ball races 3 and 23.

25 is a ball bearing between the lower end of shaft 13 and the bottom 17ª of the gear housing, and rigid with said shaft is a large bevel gear 26 meshing with the bevel gear 27 secured on the drive shaft 28 extending into the gear housing through a tubular extension 29 of tubular member 16 thereof. Friction is reduced to the minimum by a ball bearing 30 and a thrust bearing 31. The detail construction of the various ball bearings and thrust bearings is not described as the particular types of bearings are not essential to this invention.

Assuming that shaft 28 is operated, it will be seen that it transmits power through gears 27, 26, shaft 13, gear 12 and gear 11 to the differential housing, and that the latter through its spider and the pinions 9 imparts rotation to the shaft gears 10 and drives the same at equal speed as long as the car is traveling in a straight line, it being apparent that should the axle be turned to effect turning movement of the car, the differential pinions will turn around their own axes on the spider and thereby accelerate the rotation of the gear wheel 10 at the outer side of the turning car and effect a proportionate diminution in the speed of rotation of the corresponding gear wheel 10 at the inner side of the car as occurs in all differentials.

From the above description it will be apparent that I have produced a combined fifth wheel and axle drive for automobiles embodying the features of advantage enumerated as desirable, and I wish it to be understood that I do not desire to be restricted to the exact details of construction shown and described but reserve the right to make all changes falling within the spirit and scope of the appended claims.

I claim:

1. A combined fifth wheel and axle drive, comprising a stationary vertical tubular housing provided with horizontal slots in its lateral faces, an axle comprising a horizontal ring journaled in the housing and provided at diametrically-opposite points with inwardly-projecting tubular alined portions, and tubular portions extending outwardly through the opposite slots of the housing, a sectional shaft extending through the axle and journaled within the housing in said inwardly-projecting portions of the ring, a differential gearing connection for the shaft sections, including a pair of differential housing members between said inwardly-projecting portions of the ring, and means for rotating the differential housing.

2. A combined fifth wheel and axle drive, comprising a stationary vertical tubular housing, consisting of a vertical tubular member having a bearing, an upwardly-facing internal ball race, an internal downwardly-facing ball race, and horizontal slots in its lateral faces, in combination with an axle, comprising a horizontal ring fitting snugly in the housing and provided with oppositely-facing ball races, inwardly-projecting tubular portions and tubular portions projecting outwardly through the said slots, two series of balls in the ball races of the ring and housing to facilitate turning of the former, a sectional shaft extending through the axle and journaled within the housing, in said inwardly-projecting portions of the ring, a differential gearing connection for the shaft sections, including a pair of differential housing members between said inwardly-projecting portions of the ring, a gear wheel on one of said differential housing members, a vertical shaft journaled in said bearing, a gear wheel on the upper end of said shaft, meshing with the first-named gear wheel, a gear wheel on the lower end of said shaft, a drive shaft extending into and journaled on the stationary housing, and a gear wheel on said shaft, meshing with the gear wheel on the lower end of the said vertical shaft.

3. In a combined fifth wheel and axle drive, a stationary vertical tubular housing, consisting of a tubular member having a bottom, a central bearing above the bottom, and an upwardly-facing internal ball race above the bearing, and a cap member secured upon the upper end of the first-named member and provided with an internal downwardly-facing ball race above the first-named ball race, the meeting edges of the said members having registering notches conjointly forming horizontal slots in the lateral faces of the housing.

In testimony whereof, I affix my signature, in the presence of two witnesses.

NEZZA N. WILLIAMS.

Witnesses:
H. C. RODGERS,
G. Y. THORPE.